United States Patent
Berezin et al.

(10) Patent No.: US 11,067,203 B2
(45) Date of Patent: Jul. 20, 2021

(54) SPIRAL-WELDED POLYMER PRODUCTS WITH A CELLULAR WALL AND THERMOPLASTIC PROFILE FOR ITS PRODUCTION

(71) Applicants: Oleksandr Mykolayovych Berezin, Kyiv (UA); Sergii Viktorovych Sereda, Mykolaiv (UA)

(72) Inventors: Oleksandr Mykolayovych Berezin, Kyiv (UA); Ihor Yevhenovich Pliushchiev, Kyiv (UA)

( * ) Notice: Subject to any disclaimer, the term of this patent is extended or adjusted under 35 U.S.C. 154(b) by 477 days.

(21) Appl. No.: 16/066,410

(22) PCT Filed: Mar. 22, 2016

(86) PCT No.: PCT/UA2016/000034
§ 371 (c)(1),
(2) Date: Jun. 27, 2018

(87) PCT Pub. No.: WO2017/061977
PCT Pub. Date: Apr. 13, 2017

(65) Prior Publication Data
US 2019/0011064 A1   Jan. 10, 2019

(30) Foreign Application Priority Data

Oct. 9, 2015   (UA) .............................. a 2015 09806

(51) Int. Cl.
*F16L 9/00*   (2006.01)
*F16L 9/16*   (2006.01)
(Continued)

(52) U.S. Cl.
CPC .............. *F16L 9/006* (2013.01); *B29C 53/78* (2013.01); *B32B 1/08* (2013.01); *F16L 9/12* (2013.01);
(Continued)

(58) Field of Classification Search
CPC .... B32B 1/08; F16L 9/00; F16L 9/006; F16L 9/12; F16L 9/121; F16L 9/123;
(Continued)

(56) References Cited

U.S. PATENT DOCUMENTS 6,666,945 B1 * 12/2003 Andtbacka .......... B29C 53/8091
156/191
2007/0256751 A1   11/2007 Kellner et al.

FOREIGN PATENT DOCUMENTS

DE   2141281 A1   3/1973
FR   1373291 A    9/1964
(Continued)

*Primary Examiner* — Walter Aughenbaugh
(74) *Attorney, Agent, or Firm* — Nadya Reingand; Yan Hankin

(57) ABSTRACT

The invention relates to production of long spiral-welded large polymer products, as required for pipelines production, chemical, oil and gas and petrochemical industries, agricultural complex and utility services. The object of the invention is to create variants of spiral-welded polymer product with a cellular wall, having the internal or external, or internal and external uniform smooth walls with little material consumption, weight and cost. It should allow making products on site due the use of a thin-walled, lightweight, flexible profile. The object is solved owing to fact that a long hollow thermoplastic profile is used in spiral-welded polymer products, wherein the cross-section of the profile has a form of a closed geometric figure with a convex part having essentially the semi-ring shape and flat part that are connected each other, forming the convex and flat parts of the external surface of the profile, respectively.

11 Claims, 3 Drawing Sheets

(51) Int. Cl.
*B32B 1/08* (2006.01)
*F16L 9/133* (2006.01)
*B29C 53/78* (2006.01)
*F16L 9/12* (2006.01)
*F16L 11/118* (2006.01)
*B29D 24/00* (2006.01)

(52) U.S. Cl.
CPC ............... *F16L 9/133* (2013.01); *F16L 9/16* (2013.01); *B29D 24/001* (2013.01); *F16L 11/118* (2013.01); *F16L 11/1185* (2013.01); *Y10T 428/139* (2015.01)

(58) Field of Classification Search
CPC ....... F16L 9/16; F16L 9/18; F16L 9/19; F16L 9/133; Y10T 428/139; Y10T 428/1393
See application file for complete search history.

(56) References Cited

FOREIGN PATENT DOCUMENTS

| | | |
|---|---|---|
| FR | 2350943 A | 12/1977 |
| UA | 15836 U | 7/2006 |

\* cited by examiner

SPIRAL-WELDED POLYMER PRODUCTS WITH A CELLULAR WALL AND THERMOPLASTIC PROFILE FOR ITS PRODUCTION

CROSS-REFERENCE TO RELATED APPLICATIONS

The present patent application is a National stage application of the PCT application PCT/UA2016/000034 filed Mar. 22, 2016, which claims priority to Ukrainian Patent Application UA a201509806 filed Oct. 9, 2015.

TECHNICAL FIELD

The invention relates to production of long spiral-welded large polymer products, as required for pipelines production, chemical, oil and gas and petrochemical industries, agricultural complex and utility services. These structures can be used for drinking water supply and sanitation, construction of sewers, treatment plants, reservoirs, tanks, and containers to store fluids or granular substances, in particular, to store chemical substances and toxic waste.

Also, the invention relates to profiles used for production of big spiral-welded polymer structures.

BACKGROUND ART

For a clear understanding of terms used herein, please see their explanation below:

The term "product" means a channel with a closed cross-section of tubular, cylindrical, conical, spherical shape and the like;

The term "profile" means a long hollow product having a constant cross-section along the length.

Spiral-welded long polymer products are made of relatively inexpensive thermoplastic polyolefins, such as polyethylene (PE 80, PE 100) or polypropylene. They have significant advantages over products made of concrete, fiberglass, ceramics, etc., because they are more plastic and flexible and provide integrity even in landslide soils, are lighter, resistant to hydro abrasion, deformation impact, have better hydraulic properties (The System of Contoured Pipes for Water Removal and Sewerage. KORSYS PLUS. Technical Manual, POLYPLASTIC Group, P. 4-6)]. Recently, developers of thermoplastic products faced the challenge of manufacturing reliable strong spiral-welded products of large diameter (300 mm to 9000 mm or more) having the great ring stiffness and the smooth surface to provide reliability, low material consumption, low weight, and therefore low cost. In addition, it should be easy to manufacture on site with any desired length.

There are Krah pipes, which are characterized by a range of internal diameters up to 4000 mm with maximum wall thickness up to 200 mm and a maximum length up to 6 m. (KRAH Pipes Catalogue, http://www.iplast.com.ua/User-Files/File/catalog_ua.pdf p. 2,4). These pipes are made of lengthy band profile by coiling it into drum (New method of large pipes production of the Krah Company)] http://polymery.ru/letter.php?cat_id=3&n_id=482). To increase the ring stiffness, they use double- or multi-layered spiral-welded constructions (http://www.iplast.com.ua/UserFiles/File/catalog_ua.pdf S. 14), where subsequent layers are formed of tubular corrugated profiles, coated with melt polymer. Pipes have sufficient ring stiffness, but their main drawbacks are high consumption of materials, impossibility to build a pipe with smooth walls, and impossibility to produce a pipe on site.

There are spiral-welded polymer products with a cellular wall, manufactured by Oy KWH Pipe (U.S. Pat. No. 5,127, 442, 1992; patent UA 41314C2, 2001 (WO93/22126) patent RU 2229381C2, 2004; UA 81 505U, 2013). Spiral-welded hollow polymer products by Oy KWH Pipe Company use the long hollow thermoplastic profiles having a rectangular cross-section (UA 82688C2, 2008; UA 104 232C2, 2014). To increase the product rigidity, they use a profile with a thick wall. Products of Oy KWH Pipe may be manufactured at the factory only, as a rectangular profile cannot be transported to the place of piping without deformation.

Other manufacturers also produce spiral-welded polymer pipes with a cellular wall, in particular, as described in patent documents: SU 1823818, 1993; UA 2669C2, 2005; UA 14677U, 2006; UA 100049C2, 2012; UA 101 101C2, 2012. There are polymer shaped products (RU 2012157714A, 2012) and polymer profiles used for production of spiral-welded pipes: hollow tubes, INP profiles, D-shaped cross-sections etc. (UA 2669C2, 2005, CN101666399A, 2010). In particular, Energoresurs-Invest Corporation produces pipes of particularly large diameter from 600 mm to 6000 mm (Catalogue of Energoresurs-Invest Corporation. Polymer Pipes and Hollow (Cellular) Structures for Water Supply and Drainage), p. 6), inspection manholes with a diameter up to 2000 mm (ibid, fig. on P. 9, Table P.13), tanks for drinking water up to 4,000 mm (ibid, fig. I, Table on p. 19, fig. p. 20).

The most similar one to the first variant of the claimed product is a spiral-welded polymer product with a cellular wall shown in FIG. 1 of the Patent Specification UA 8072U, 2005. A product is made of a hollow long tightly wound spiral thermoplastic profile. The cross-sectional profile is a closed geometrical figure in the form of a ring. At that, profile coils are wound to the size of the required product diameter, and adjacent coils are interconnected by the extrusion welding.

The major drawback is the impossibility to create smooth walls. In order to level the product to some extent, gaps between the knobs are filled the extruded polymer material, which method is rather costly and increases material consumption, weight, and cost of products.

The most similar one to the second and third variants of the claimed product is a spiral-welded polymer product with a cellular wall shown in FIG. 1 of the Patent Specification UA 15836U, 2006. A product is formed of two identical, upper and lower, long hollow thermoplastic profiles. A lower profile is tightly wound in a spiral to the size of the required internal diameter of the product, and another, upper one, is wound over the lower profile with the axial displacement to half the width of the lower profile. The cross-section of each profile is a closed geometrical figure in the form of a ring, which forms a convex outer surface around the profile perimeter. Outer radiuses of the profile cross-section are the same. Adjacent coils of each profile and another profile, located between these adjacent coils, are interconnected by extrusion welding.

Such product has better ring stiffness as compared to a single-layer product. However, a major drawback of the known products is the impossibility to achieve a flat smooth surface of the product. To level the product surface, gaps between the knobs are filled with the extruded polymer material, which method is rather costly and increases material consumption, weight, and cost of products.

The most similar one to the fourth variant of the claimed product is a spiral-welded polymer product with a cellular wall shown in FIG. 2 of the Patent Specification UA 15836U, 2006. The product is made of an internal, external and an intermediate long hollow thermoplastic profile of the same diameter, each one has a ring cross-section and forms a convex outer surface around the profile perimeter. An internal profile is tightly wound to the size of the required internal diameter of the product, and an intermediate profile is wound over the internal profile with the axial displacement to half the width of the internal profile. An external profile is wound over of the intermediate one with the axial displacement to half the width of the internal profile. Adjacent coils of each profile and a coil of another profile, which is located between these adjacent coils, are interconnected by welding. The gaps between adjacent coils are filled with the extruded polymer.

The described construction has the same drawbacks as those above for the closest analogues. In addition, it requires additional equipment for profiles welding into the product (three weld heads are required to get a quality weld).

The most similar one to the claimed profile is a long hollow thermoplastic profile for production of spiral-welded polymer pipes with a cellular wall, shown in UA 8072U, FIG. 1 of the Specification, 2005. A profile has a ring cross-section and the convex external surface.

The drawback of the described profile is the impossibility to produce products with flat smooth surface, high cost of the extruded material. In addition, a profile is massive and inflexible, which causes complications during transportation to the place of manufacturing.

DISCLOSURE OF THE INVENTION

The object of the first variant of the invention is to create a single layer spiral-welded polymer product with a cellular wall, having a smooth wall with little material consumption, weight and cost. It should allow making products of unlimited length on site through the use of a thin-walled, lightweight, flexible profile.

The object of the second variant of the invention is to create a double-layered spiral-welded polymer product with a cellular wall, having the smooth internal and external surfaces and sufficient ring stiffness with little material consumption, weight and cost. It should allow making products of unlimited length on site through the use of a thin-walled, lightweight, flexible profile.

The object of the third variant of the invention is to create a double-layered spiral-welded polymer product with a cellular wall having uniform smooth surface and increased ring stiffness with lower material consumption and cost, and more convenient manufacturing as compared with known products.

The object of the fourth variant of the invention is to create a multilayered spiral-welded polymeric product with a cellular wall with two smooth surfaces, having the increased ring stiffness, with lower material consumption and cost, and more convenient manufacturing as compared with known products.

Additionally, the object of the invention is to create a long hollow thermoplastic profile for spiral-welded polymer products, which would provide the required ring stiffness of the product with lower material consumption, weight and cost. Also, it should be flexible and allow easy spooling, be suitable for creating spiral-welded products on site.

The object of the first variant is solved as follows. A spiral-welded polymer product with a cellular wall is made as its closest analogue of the long hollow thermoplastic profile, tightly wound to the size of the required product diameter. The cross-section has the form of a closed geometric figure with a convex part and another part connected to the convex part, forming the convex and other parts of the external profile, respectively. The convex outer surface of the profile has a semi-ring cross-section. Adjacent coils of the profile are interconnected by welding. According to the first variant of the invention, another part of the outer surface is flat. This flat part of the outer surface of the profile is oriented inside or outside of the product; at that, it forms a continuous flat surface of a product, internal or external one, respectively. In addition, a semi-ring is made so, that the width L of the flat outer profile surface and the profile height H are linked by a ratio $$1,5 \leq \frac{L}{H} \leq 2.$$

The resulted flat and smooth surface does not require filling gaps between adjacent coils with extruded polymers. A semi-ring cross-section has a reduced cross-sectional area as compared to a ring profile and, therefore, less polymeric material is needed to make the product. The ratio $$1,5 \leq \frac{L}{H} \leq 2$$

is an optimal. At lower values of the $$\frac{L}{H}$$

ratio, a cross-section becomes a combination of a semi-ring and a channel with decreased flexibility, increased weight, eliminating the possibility of coil winding without the profile deformation. When the $$\frac{L}{H}$$

ratio is more than two, a cross-sectional profile transforms into a segment, which is thinner than semi-ring and therefore reduces the ring stiffness of the product.

To protect the flat surface of a product from atmospheric conditions, UV radiation, to increase strength, reduce surface roughness, etc., a flat part of the outer surface of the product may include at least one additional layer of material with other physical and chemical properties than the profile material, and may contain several additional layers of material, depending on the product use. The layers are applied to the profile surface by known methods. It is advisable that the additional layer thickness is not greater than the profile wall thickness in the area of its flat surface. But depending on the product use, other profile constructions are possible with greater thickness of the additional layer.

The object of the second variant is solved as follows. A spiral-welded polymer product with a cellular wall is formed of two, upper and lower, long hollow thermoplastic profiles, wound in a spiral, having the same cross-sectional shape and external dimensions. A lower profile is tightly wound in a spiral to the size of the required internal diameter of the product, and the upper profile is wound over it with the axial displacement to half the width of the coil of the internal profile. The cross-section of each profile is a closed geometric figure that consists of the essentially semiring convex part and another part, which form respectively convex and other parts of the external profile surface. At that, adjacent coils of each profile and another profile, located between these adjacent coils, are interconnected by welding.

According to the second variant of the invention, the other part of its outer surface is a flat surface; a flat part of the outer surface of the lower profile is oriented inside the product and forms its continuous smooth inner surface, and a flat part of the outer surface of the upper profile is oriented outside and forms a continuous flat outer surface. The width L of the outer surface of each profile and height H of the profiles are linked by a ratio $$1,5 \le \frac{L}{H} \le 2.$$

Thus, a product has an outer and inner smooth surface, thinner double-layered wall as compared to the single-layered wall of the known product, and provides increased ring stiffness with material consumption close to the manufacture of single-layer product with a ring profile. As for the first variant, at least one additional layer of material with other physical and chemical properties than the profile material may be applied by coextrusion to the flat profile surface. An additional layer may be applied to the external or internal surface and the both surfaces of the product.

The object of the third variant is solved as follows. A spiral-welded polymer product with a cellular wall is formed by the first and second lengthy closed hollow thermoplastic profiles. Profiles are arranged so that one is wound over another. At that, the lower profile is wound in a spiral to the size of the required internal diameter of the product, and the upper profile is wound with the axial displacement to half the width of the coil of the internal profile; at that, coils of the second profile are wound tightly with no gaps between them. A cross-section of each profile is a closed geometric figure. The figure of the first cross-sectional profile is a ring, and the figure of the second cross-sectional profile consists of a convex part having essentially the semiring shape and another part connected to the convex part, which forms convex and another part of the outer surface of the second profile respectively. Convex surfaces of the profile face each other. Adjacent coils of each profile and a coil of another profile, located between these adjacent coils, are interconnected by welding.

According to the third variant of invention, another part of an outer surface of the second profile is flat. The width L of the flat part of the outer surface and height H of the profile are linked by a ratio $$1,5 \le \frac{L}{H} \le 2.$$

At that, the second profile can be either lower or upper one. A flat part of its outer surface is oriented either inside or outside of the product, respectively, and forms an internal or external continuous flat surface, respectively.

At that, the preferable option is that a flat part of the outer surface of the second profile comprises at least one additional layer of material with other physical and chemical properties than the profile material. If it is required to provide the ring stiffness and reduce the product thickness, the outer radius of the ring cross-section of the first profile may be less than the outer radius of a semi-ring section of the second profile.

If it is necessary to increase the ring stiffness with the lower position of the second profile, product includes at least one additional profile with a ring cross-section, which is wound over the first profile with an axial displacement to half the width of the coil of the first profile. At that, the outer radius of the ring cross-section of an additional profile may be less or equal to the outer radius of the ring section of the first profile.

The object of the fourth variant is solved as follows. A spiral-welded polymer product with a cellular wall is made of an internal, external, and at least one intermediate long closed hollow thermoplastic profiles. An internal profile is tightly wound in a spiral to the size of the required internal diameter of the product; each subsequent profile is wound over the preceding profile with axial displacement to half the width of the coil of the internal profile. The cross-section of each profile is a closed geometric figure, the cross-section of the intermediate profile has a ring shape, the cross-sectional shape of the internal and external profiles consists of a convex part and another part, connected to the convex part, which form the convex and the other portion of the outer surface of the inner and external profiles. The convex part of the outer surface of the inner and outer profiles in cross-section is a semi-ring having similar outer radius for internal and external profiles. The adjacent coils of each profile and a coil of another profile, as located between these adjacent coils, are interconnected by welding. According to the fourth variant of invention, another part the outer surface of the inner and outer profiles is flat. Flat part of outer surface of the internal profile is oriented inside the product and flat part of outer profile is oriented outside of the product. Both profiles form continuous smooth internal and external surfaces of the product, respectively. The external radius Ri of a ring cross-section of the intermediate profile can be equal to the outer radius R of a semi-ring cross-section of the internal and external profiles, and may be less, but not less than the half radius R. The width L of a flat outer surface of the inner and outer profiles is linked to the height H of the profile by a ratio $$1,5 \le \frac{L}{H} \le 2.$$

If there are two or more intermediate profiles, the outer radius $R_1$ of a ring cross-section of each odd or even intermediate profile may be reduced to the half value of the R. At that, the outer radius of the ring cross-section of each odd or even intermediate profile, respectively, should be equal to the outer radius R of a semi-ring cross-section of the internal and external profiles.

The preferable option is that a flat portion of the outer surface of the internal profile or a flat portion of the outer surface of the external profile comprises at least one additional layer of a material with other physical and chemical properties than the internal or external profile material, respectively. It's also possible to apply an additional layer of material with other physical and chemical properties to the outer surface of the internal and external profiles.

The object of creation of a long hollow thermoplastic profile for the production of spiral-welded polymer products is solved as follows. A long hollow thermoplastic profile for the production of spiral-welded polymer products, like its closest analogue, has a cross-section in the form of a closed geometric figure with a convex portion connected to another part, which form the convex part and another part of an outer surface of the profile. At that, a convex part of an outer surface of the profile has a semi-ring cross-section. According to the invention, another part of the outer surface of a profile is flat and forms a flat part of its outer surface. At that, the width L of the flat portion of the outer surface of a profile and the profile height H are interconnected by a ratio $$1,5 \le \frac{L}{H} \le 2.$$

The preferable option is that a flat portion of the outer surface of the profile contains at least one additional layer of material with other physical and chemical properties than the profile material.

BRIEF DESCRIPTION OF DRAWINGS

The invention is illustrated by drawings, where.

DESCRIPTION OF EMBODIMENTS

Figure 1:
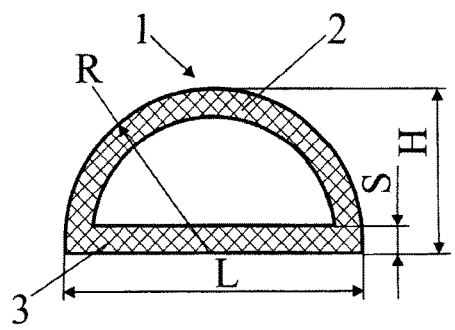
FIG. 1 shows a cross-section of the claimed profile.
Figure 2:
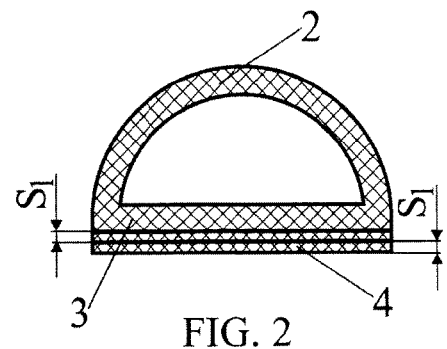
FIG. 2—a cross-section of the profile with two additional layers of material to be used in a product with internal flat surface.
Figure 3:
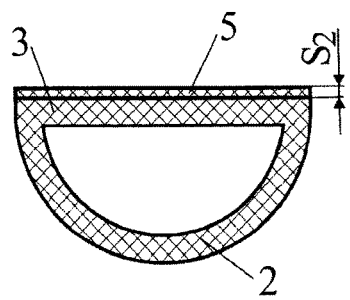
FIG. 3—a cross-section of the profile with an additional layer of material to be used in a product with external flat surface.

A long thermoplastic profile 1, the cross-section of which is shown in FIG. 1, is made by extruding a molten thermoplastic polymer through an expansion nozzle with calibration of external surface and of internal surface, if required. The expansion nozzle has a matrix, which cross-section resembles essentially a semi-ring, and a moving rod, having the similar, but smaller cross-sectional outline, which forms the inner surface of a profile. A profile bar is squeezed through an expansion nozzle and extends through the calibration head. Due to the vacuum in the calibrator tank, a bar is tightly pressed to the polished surface of a calibration head and cooled down with water to form a smooth profile surface. The resulting profile has a cross-section having essentially the shape of semi-ring 2, connected to another flat portion 3. Part 3 forms a flat portion of the outer surface. In order to obtain the necessary flexibility, the width L of the flat part of the outer profile surface should be no more than two heights H of the profile, but not less than one and the half of the height H. The profile can be made of high-density polyethylene (PE 80, PE 100) or polypropylene, acrylonitrile-butadienestyrene, polyamide, polycarbonate or any other thermoplastic material. Depending on the profile destination, it is produced and wound with its flat surface facing downwards (for further use to form the inner surface of the product, as shown in FIG. 2) or upwards (for future use to form the outer surface of the product, as shown in FIG. 3). To provide greater strength or certain properties, such as protection against abrasion, weathering, UV radiation, etc., an additional layer 4 or 5 of a material with appropriate properties is applied on a flat portion of the outer profile surface by co-extrusion. For example, to create an additional conductive layer, conductive fillers containing metal particles or polymers, like polyacetylene, polythiophene, polyaniline or ionomers containing alkali metals and ions of alkali metals are added to the base material of the profile. To strengthen the flat part of the outer surface of the additional layer 5 and protect it from mechanical damage, it is covered by an extra layer of base material with additives in the form of mineral microparticles or, if coextrusion or bonding between the profile material and an additional layer is possible, then a separate layer shall be applied. Thus, if the flat outer profile surface should meet the antiadhesive requirements or have a low friction coefficient, or be resistant to UV radiation, than polytetrafluoroethylene (Teflon) shall be added to an additional layer 5 of material; if the surface should be slip-resistant, weather-resistant and light-resistant, an additional layer of material may comprise a polymeric material Polistone G Pipe Grande; if it is desired to eliminate sticking, e.g. in silos, they may perform an additional layer of high-molecular polyethylene Matrox. The profile can contain more than one additional layers of material, depending on the required properties of the products.

Figure 4:
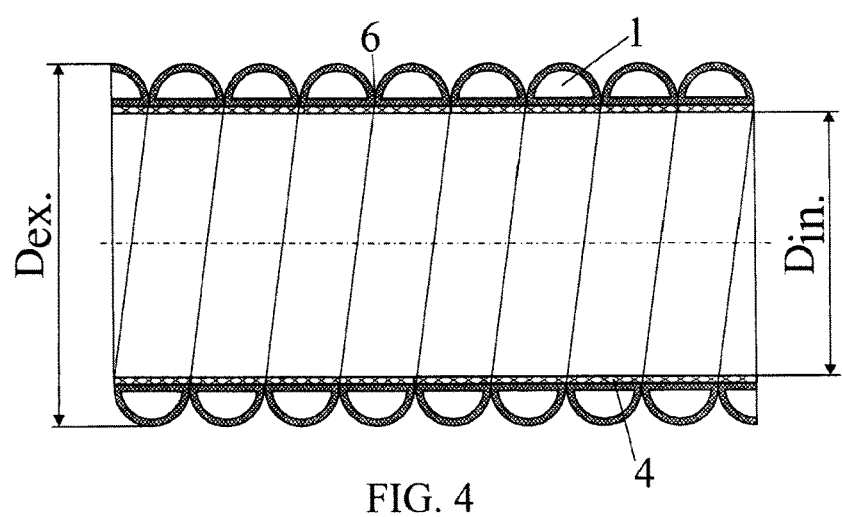
FIG. 4—a cross-section of the first variant of a single-layer product with a smooth inner surface.

A single-layered spiral-welded product as shown in FIG. 4 is produced by winding the above described profile 1 with an additional layer of material 4 using special rollers in a spiral to the size of the required product diameter. A profile is tightly wound with a special drum. At that, a profile is put in the winding device so that a flat part 3 of the outer surface of the profile was oriented inside the product. Tightly wound coils face each other and form an internal surface of a product in the wound condition. They are welded together from the outside using the double weld 6. A product can be welded by a heated tool, hot air, extruded melt and the like. As a result, the product has a smooth, flat surface, roughness of which is several times lower than the roughness of all known analogues. In addition, due to application of the additional layer 4 on a flat surface 3, a flat profile surface gets the new necessary properties. As compared to the prototype, a product has the lower consumption of material for welding, is more lightweight and requires less cost. It may be welded by one head, as requires only the external welding. The product is easy to produce in the field, as the profile flexibility is almost double the flexibility of a ring profile.

Figure 5:
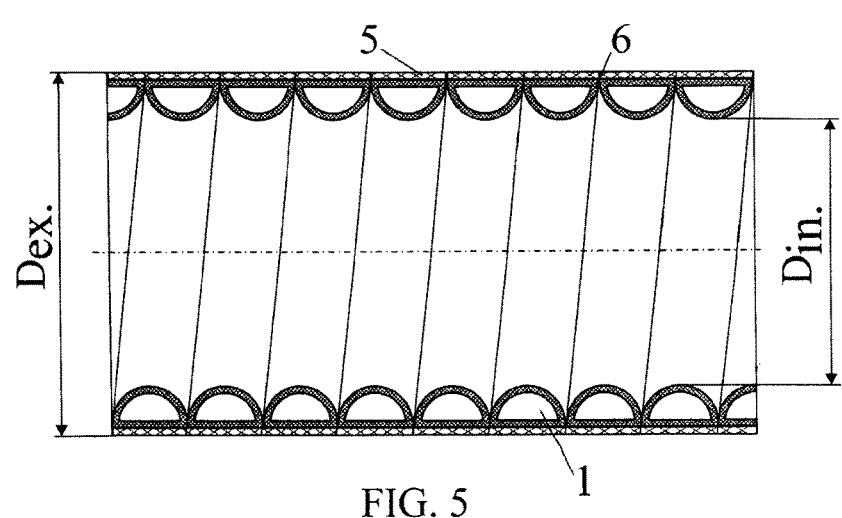
FIG. 5—a cross-section of the first variant of a single-layer product with a smooth outer surface.

A single-layered spiral-welded product as shown in FIG. 5 is produced using the same technology. A profile has an additional protective layer 5 of material. When winding, a profile is put in the winding device so that a flat portion 3 of the outer surface of the profile was oriented outwards.

Figure 6:
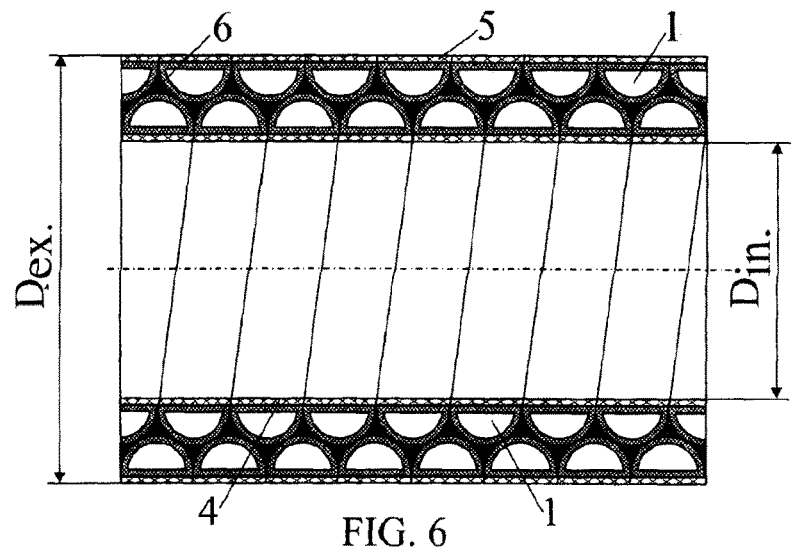
FIG. 6—a cross-section of a second variant of a double-layered product with two smooth surfaces.

Double-layered products, as shown in FIG. 6, are formed of two identical profiles 1 as described above, each of which has an additional protective layer 4 or 5. This product can be used as a pipe for water supply systems (sewer and water supply), for production of polyethylene water supply wells, reservoirs for drinking water and so on. A lower profile forms a spiral to the size of the required internal diameter of the product; it is tightly wound. At that, a profile shall be set on rollers so that its flat part was inverted inside the coil at an angle to the longitudinal axis of the tube created. An upper profile is wound above the lower one in 200-300 mm in length of the first layer of the wound profile, with the axial displacement by half the width of the lower profile coil. At that, a flat part of the upper profile is oriented upwards. At the same time, they heat the profile surface and fully weld together adjacent coils of one profile and a coil of another profile, which is located between adjacent coils. Welding is carried out by impregnating extruded polymer mass 6 between coils under pressure. Welding can be done in various ways: by a heated tool, extruder etc. The specific feature of a product is that welds are located inside the product walls. Thus they make a product with two smooth surfaces; each surface is covered with a protective layer having the desired properties for the product. A profile is made to comply with the required ratio of the flat outer surface to the profile height, as a result of which the ring stiffness of a product is satisfactory, with reduced wall thickness of the product. Compared to a single-layered profile with a ring cross-section at the same SDR 11, wall thickness 5 mm, the same radius R 25 mm, and a ratio $$\frac{L}{H} = 2$$

in a semi-ring profile, me wall thickness of a product made of two semi-ring profiles is 1.2 times less than the thickness of a single-layered product. Products made of a semi-ring profile are more technological. At their welding on site, consumption of the welding material, respectively, energy, water, technology, etc. is 2.5 times less as compared to manufacturing of a ring profile. Flexibility of a semi-ring profile is twice as much as the tubular profile flexibility; length of a profile in a coil is almost twice as much. Therefore, there are less welded joints along the pipe length, the pipe quality is higher. The protective coating gives the extra product strength and resistance to external influences. Thus, it was found that adding mineral particles to a polypropylene additional layer 4 or 5 increases the hardness of an additional layer as compared to polyethylene PE 100 in three times.

Figure 7:
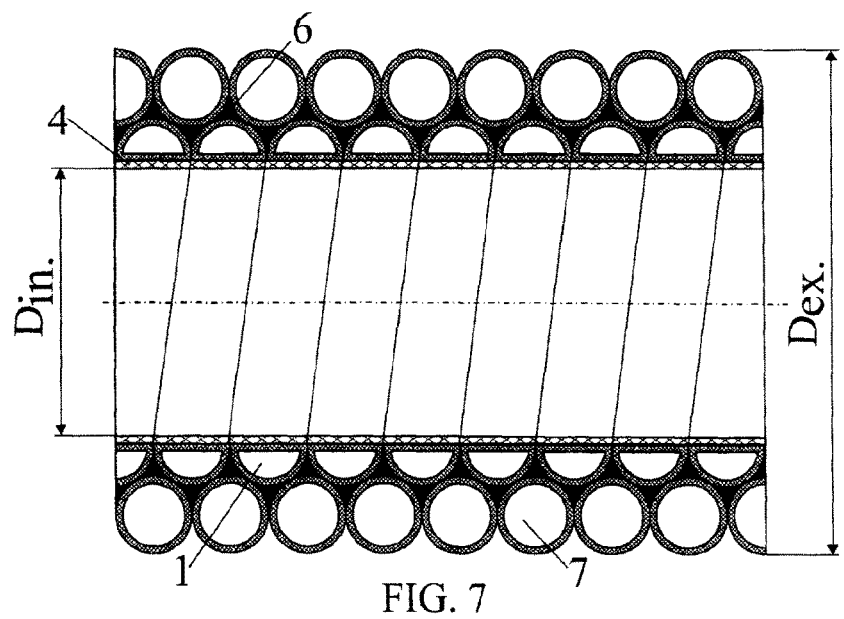
FIG. 7—a cross-section of the third variant of the product with a smooth inner surface.
Figure 8:
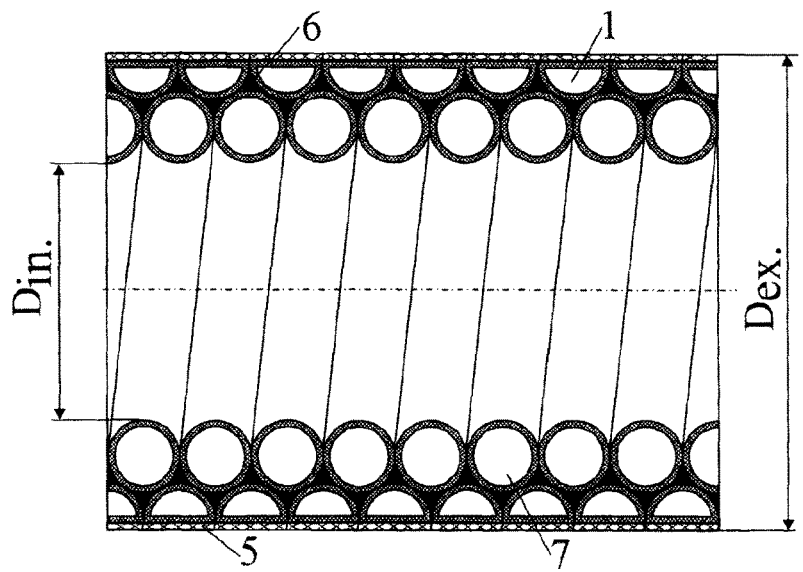
FIG. 8—a cross-section of the third variant of the product with a smooth outer surface.

A double-layered spiral-welded product of the third variant has a smooth flat surface formed by profile 1 and another surface formed by a circular tubular profile 7. It may have an internal flat surface as shown in FIG. 7, or can be made with a smooth outer surface as shown in FIG. 8. It may have a protective coating 4 of the flat surface inside the product, may have a protective coating 5 of flat surface on the product outside. They form a product similar to that described above.

Figure 9:
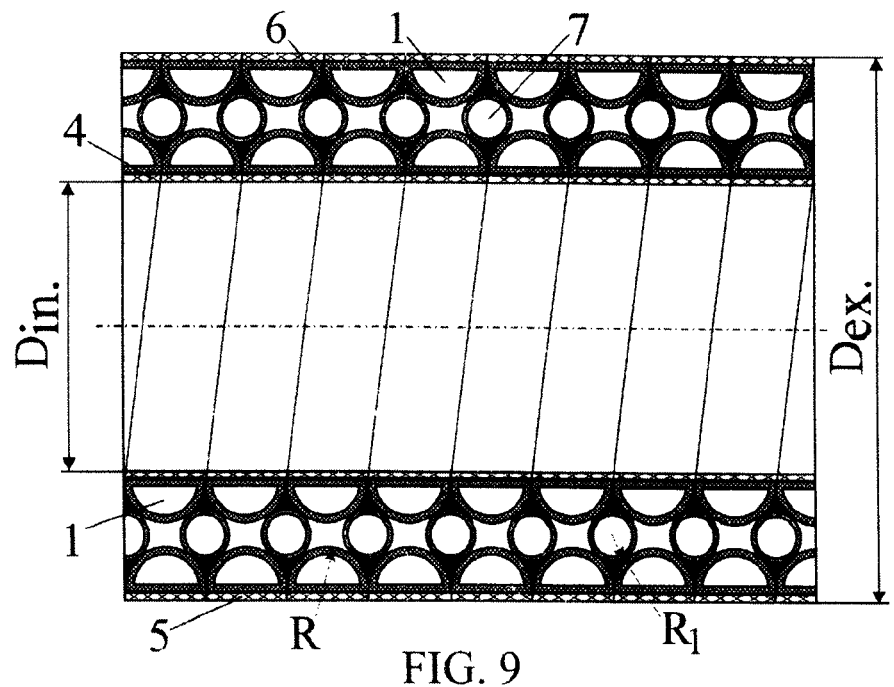
FIG. 9—a cross-section of the fourth, three-layered, variant of the product with two flat surfaces, where the outer radius of the intermediate profile is less than the outer radius of a semi-ring cross-section of the internal and external profiles.
Figure 10:
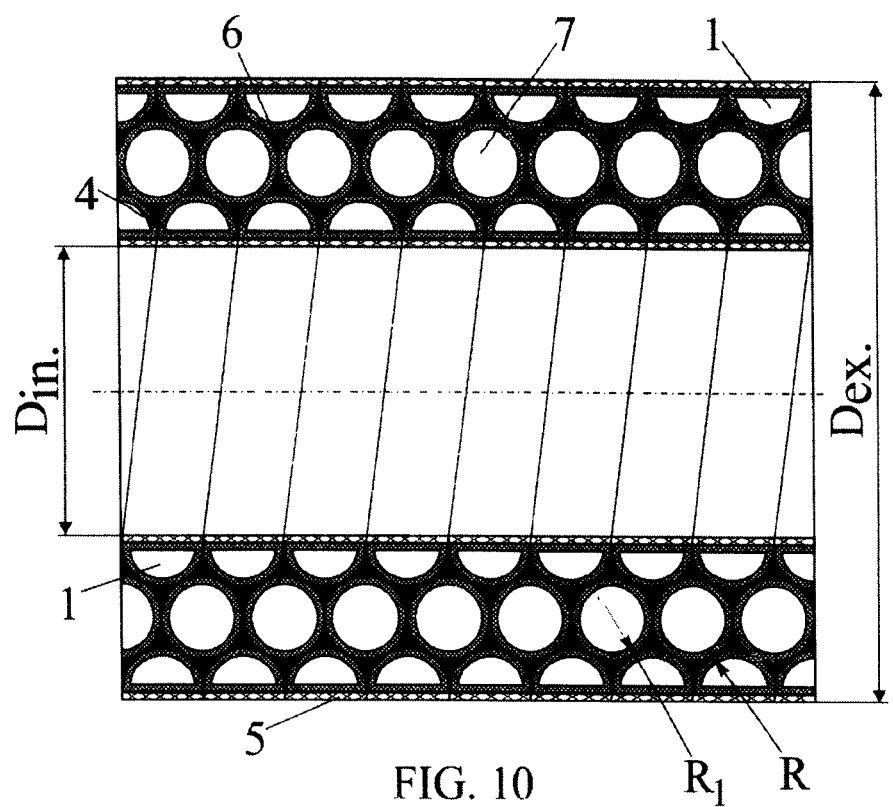
FIG. 10—a cross-section of the fourth, three-layered, variant of the product with two flat surfaces, where the outer radius of the intermediate profile is equal to the outer radius of a semi-ring cross-section of the internal and external profiles. The drawings, together with examples of specific execution, only explain the essence of the claimed invention and do not restrict the scope of the rights defined in claims.

A tree-layered spiral-welded product of the fourth variant is formed of two profiles 1 and one intermediate profile 7 having a ring cross-section. A product is made as described above. Profiles 7 can be wound in the product as much as necessary to obtain the desired wall thickness and ring stiffness. It is possible to produce a product with the outer radius R of semi-ring cross-section of profiles 1 equal to the radius R] of a ring of the intermediate profiles 7, as shown in FIG. 10. If it is required to reduce the wall thickness and preserve its ring stiffness, the external radius R] of a ring cross-sectional of an intermediate profile 7 may be equal to half the radius R, as shown in FIG. 9. If there are two intermediate profiles, any of them may have the reduced radius of a cross-section, either upper or lower intermediate profile; if there are three or more profiles, than the next nearest profile may have the reduced radius of a cross-section: either even or odd ones. Similarly to the above described embodiments, the fourth variant of the product has a protective coating 4 of a flat surface inside the product, and a protective coating 5 of the outer surface. They form and weld product similar to that described above.

New product variants have flat smooth surfaces; their roughness is significantly reduced compared to existing analogues; smooth surface profiles make it possible to obtain smooth protective coating, which expands the possibility of their use. Specifically, for example, applying a protective coating with antibacterial material TroBlok on the flat surface prevents formation of microbes, bacteria, viruses, and molds on its walls. A product becomes the first-choice product for making reservoirs and pipelines for the storage and supply of drinking water in areas with water shortage. Products may have different diameters, different number of layers or various ring stiffness. They are simple and the technological in use and application, consume less material and are lightweight.

What is claimed is:

1. A spiral-welded polymer product with a cellular wall, comprising:
   a long hollow thermoplastic profile, tightly wound in a spiral in accordance with a size of a required product diameter, where a cross-section of the profile has a form of a closed geometric figure with a convex part having essentially a semi-ring shape, and an other part coupled to the convex part, forming the convex and the other part of an-external profile surface, respectively;
   adjacent coils of the profile interconnected by welding, wherein the other part of the external profile surface is flat;
   the flat external surface of the profile in a coiled state, i-s oriented inside or outside of the product;
   the flat external surface forming a continuous smooth surface of the product whether oriented inside or to outside of the product; and
   a width L of the flat external surface of the profile and a height H of the profile corresponding by a ratio of L:H between 1.5 and 2.

2. The spiral-welded product according to claim 1, wherein the flat part of the external profile surface comprises at least one additional layer of material with other physical and chemical properties than the profile material.

3. A spiral-welded polymer product with a cellular wall, comprising:
   upper and lower, long hollow thermoplastic profiles, wound in a spiral, having a same cross-sectional shape and external dimensions, in which the lower profile is tightly wound in a spiral to a size of a required internal diameter of the product, and the upper profile is wound over the lower profile with an axial displacement to half the width of the coil of the lower profile;

a cross-section of each profile is a closed geometric figure with a convex part, having essentially a semi-ring shape, and an other part, which form respectively the convex and the other parts of an external profile surface, adjacent coils of each profile disposed substantially between the adjacent coils of the other profile, the coils interconnected by welding;

wherein the other part of each the upper profile and the lower profile external surface is flat;

wherein a flat external surface of the lower profile is oriented inside the product and forms its continuous smooth inner surface, and a flat external surface of the upper profile is oriented outside and forms a continuous flat outer surface; and the width L of the external surface of each profile and the height H of the profiles correspond by a ratio of L:H between 1.5 and 2.

4. The spiral-welded product according to claim 3, wherein the flat external surface of each profile contains at least one additional layer of material with other physical and chemical properties.

5. A spiral-welded polymer product with a cellular wall, comprising:

lower and upper long closed hollow thermoplastic profiles, wound in a spiral such that the upper profile is wound over the lower profile;

the lower profile is wound in a spiral to a size of a required internal diameter of the product, and the upper profile is wound with an axial displacement to half the width of a coil of an internal profile;

the coils of the profiles wound tightly with no gaps between them, and a cross-section of each profile is a closed geometric figure, which has a ring form for the one profile whereas for the other profile the cross-section comprises a convex part, having essentially a semi-ring shape, and another an other part coupled to the convex part, which form the convex and the other part of the external surface of the other profile respectively;

wherein convex surfaces of the profiles face each other and adjacent coils of each profile and a coil of the other profile, located substantially between the adjacent coils, are interconnected by welding;

wherein the other part of the external surface of the other profile is flat;

wherein the width L of the flat part of the external surface and the height H of the other profile correspond by a ratio of L:H between 1.5 and 2; and wherein a flat external surface of one of the profiles is oriented either inside or outside of the product, forming an internal or external continuous flat surface, respectively.

6. The spiral-welded product according to claim 5, wherein the flat external surface of one of the profiles comprises at least one additional layer of material comprising other physical and chemical properties than the profile material.

7. The spiral-welded product according to claim 5, wherein an outer radius of a semi-ring cross-section of one of the profiles is greater than an outer radius of a ring cross-section of the other profile.

8. The spiral-welded product according to claim 5, wherein at least one additional profile has a ring cross-section, wound on top of the lower profile or of the preceding additional profile with an axial displacement to half the width of a coil of the lower profile, an outer radius of the ring cross-section of the additional profile less than or equal to the radius of an outer ring cross-section of the lower profile.

9. A spiral-welded polymer product with a cellular wall, comprising:

lower, upper, and middle closed hollow thermoplastic profiles, wound in coils, where the lower profile is tightly wound in a spiral to a size of a required internal diameter of the product;

each subsequent profile is wound over a preceding profile with an axial displacement to half the width of a coil of the preceding profile;

a cross-section of each profile is a closed geometric figure, a figure of a cross-section of the middle profile having a ring shape, a cross section of the lower and upper profiles comprising a convex part, having essentially a semi-ring shape and a substantially equivalent outer radius profiles, and the other part connected to the convex part, which form a convex and the other part of an external surface of the lower and upper profiles;

adjacent coils of the lower profile and the upper profile and a coil of the middle profile, disposed between adjacent coils of the lower profile and the upper profile, are interconnected by welding;

wherein the other part of the external surface of the lower and upper profiles is flat;

a flat external surface of the lower profile oriented inside the product to form a continuous smooth inner surface of the product;

a flat external surface of the upper profile oriented outside of the product to form a continuous smooth outer surface of the product; and an outer radius of a ring cross-section of the middle profile that can be equal to or smaller than an outer radius of a semi-ring cross-section of the lower and upper profiles, but not less than half an outer radius of a semi-ring cross-section, and the width L of a flat part of the external surface of the lower and upper profiles and their height H corresponding by a ratio of L:H between 1.5 and 2.

10. The spiral-welded product according to claim 9, comprising at least two middle profiles, wherein an outer radius, $R_1$, of a ring cross-section of every odd or every even middle profile, counting from the lower profile, is equal or less than an outer radius, R, of a semi-ring cross-section of the lower and upper profiles, but not less than half of the radius R, and the outer radius of a ring cross-section of every even or odd middle profile, counting from the lower profile, respectively, is equal to the outer radius, R, of a semi-ring cross-section of the lower and upper profiles.

11. The spiral-welded product according to claim 9, wherein either or both a flat part of an external surface of the lower profile comprises at least one additional layer of material with physical and chemical properties other than a material of the lower profile, and a flat part of an external surface of the upper profile comprises at least one additional layer of material with physical and chemical properties other than a material of the upper profile.

* * * * *